United States Patent [19]

Schirrmacher et al.

[11] Patent Number: 4,722,768
[45] Date of Patent: Feb. 2, 1988

[54] DEVICE FOR CARRYING OUT GAS/SOLID REACTIONS

[75] Inventors: Ruediger Schirrmacher, Hanau; Gisbert Semmerau, Reichelsheim, both of Fed. Rep. of Germany

[73] Assignee: Degussa Aktiengesellschaft, Frankfurt, Fed. Rep. of Germany

[21] Appl. No.: 854,636

[22] Filed: Apr. 22, 1986

Related U.S. Application Data

[63] Continuation-in-part of Ser. No. 699,508, Feb. 11, 1985, Pat. No. 4,615,993, which is a continuation of Ser. No. 431,882, Sep. 30, 1982, abandoned.

[30] Foreign Application Priority Data

Oct. 22, 1981 [DE] Fed. Rep. of Germany ....... 3141906

[51] Int. Cl.⁴ ............................................. C10B 1/06
[52] U.S. Cl. ................................... 202/99; 34/164; 201/33; 201/38; 422/233; 422/223
[58] Field of Search ............... 422/142, 144, 145, 146, 422/223, 233; 202/99, 215; 34/57 A, 164; 201/38, 33; 432/58

[56] References Cited

U.S. PATENT DOCUMENTS

| | | | |
|---|---|---|---|
| 3,161,483 | 12/1964 | Morris | 34/57 A |
| 3,262,215 | 7/1966 | Davis et al. | 34/164 |
| 3,284,915 | 11/1966 | Berg | 34/164 |
| 3,703,861 | 11/1972 | Slack et al. | 34/164 |
| 3,976,597 | 8/1976 | Repik et al. | 34/57 A |
| 4,035,151 | 7/1977 | Czerny et al. | 34/164 |
| 4,107,084 | 8/1978 | Repik et al. | 502/433 |
| 4,305,210 | 12/1981 | Christensen et al. | 34/57 A |

FOREIGN PATENT DOCUMENTS

| | | | |
|---|---|---|---|
| 2030689 | 4/1980 | United Kingdom | 422/146 |
| 768452 | 7/1980 | U.S.S.R. | 422/146 |

Primary Examiner—Barry S. Richman
Assistant Examiner—Joye L. Woodard
Attorney, Agent, or Firm—Beveridge, DeGrandi & Weilacher

[57] ABSTRACT

Untreated coal is activated with steam at temperatures of 600° to 950° C. in a vibrating fluid bed, which is directly heated. The untreated coal is pre-dried by counter-current passage of the waste gases from the reaction either during feeding of the untreated coal or in the first part of the vibrating fluid bed trough. During the activation, secondary air can be passed in through a sparge pipe which is arranged parallel to the vibrating fluid bed trough. It is possible to carry out the heating exclusively with the supply of secondary air.

7 Claims, 5 Drawing Figures

DEVICE FOR CARRYING OUT GAS/SOLID REACTIONS

REFERENCE TO A RELATED APPLICATION

This is a continuation-in-part of our application Ser. No. 699,508 filed Feb. 11, 1985, now U.S. Pat. No. 4,615,993, which is a continuation of Ser. No. 431,882, filed Sept. 30, 1982, abandoned, and relied on and incorporated herein by reference.

BACKGROUND OF THE INVENTION

It is known how to activate carbon-containing raw materials. Different furnace types are used for this, but of these only the following three have attained general importance:
   directly heated rotary furnace
   the multiple hearth furnace and
   the fluid bed furnace.

The directly heated rotary furnace, which, because of its ruggedness, was very early on established for other high temperature processes, is probably the first large scale activation plant and that used most frequently. The transport of the carbonization means as well as of the energy takes place via the surface of the coal bed in contact with the gas body, while the removal of the reaction gases must take place over the same cross-section.

The surface is thus the size-determining factor of the rotary furnace technology, which can be influenced within certain limits by promoting the surface renewal (e.g. by increasing the rate of rotation and by provision of flights). (Cf. H. Helmrich et al., Chem. Ing. Techn. 51 (1979), 8, 771; J. K. Brimacombe et al., Metallurgical Transactions 9B, (1978), 201).

The multiple hearth furnace has only very recently been used for the production and re-activation of activated carbons (U.S. Pat. Ser. No. 3,994,829). It consists of a vertical, lined cylindrical housing, which is divided into separate hearths by lined trays.

The coal entering from above is transported in turn from inside to outside and vice versa over the trays and falls through holes onto the tray below. The horizontal transport of coal is accomplished by means of plough blades fixed to rotating arms. This also produces a certain surface renewal. The activating gases, heated to a high temperature, are introduced at the bottom and pass from hearth to hearth counter-currently to the coal. Each hearth can be heated by additional burners and/or additional steam or secondary air can be introduced.

The complicated mechanical arrangement of this multiple hearth furnace is at a disadvantage.

If one wants to increase the exchange surface between coal and reaction gas, flow of the gas through the coal bed suggests itself. This can be done in a fixed bed or a fluid bed.

The well known cylindrical fluid bed furnace, however, is not suitable for the activation of coals, since it has an unfavorable residence time spectrum. In processes where as high a throughput as possible is important (e.g. coal carbonization, waste combustion) the residence time behavior of the individual particle is not material. However, the activation process is a partial carbonization process, in which it is important (in order to achieve a homogeneous product) that each individual coal particle is as far as possible exposed to the same activation conditions (temperature, residence time and $H_2O$ partial pressure). Uniform temperature distribution and good equalization of partial pressure because of the intensive mixing are the main features of the fluid bed. The irregular back mixing in the cylindrical fluid bed, however, has the consequence that only about 65% of the solid is discharged after the mean residence time, while 10% of the solid remains in the fluid bed for at least three times the residence time (Cf. H. Jüntgen et al., Chem. Ing. Techn. 49 (1977) 2, MS447/77). Residence times of varying lengths, however, cause different degrees of combustion of the individual particles and thus an extension of the quality spectrum.

The decisive influence of the residence time spectrum in the activation of coal in the fluid bed can be seen from the fact that a 15-stage circular reactor is known for this purpose (J. Klein, Chem. Ing. Techn. 51 (1979) 4. MS680/79).

Various solutions have been proposed to avoid uncontrolled back mixing, e.g. dividing the reactor into several individual fluid beds, which are connected as cascades next to one another and located in a common furnace.

Another solution is known from U.S. Pat. Ser. No. 3,976,597. Here the fluid bed is in the form of a rectangular trough in which the fluidized coal—if possible in plug flow—move from the inlet to the outlet side.

The transport is accomplished by displacement of the material in the bed by the volume of coal fed in. The division of the trough into two or into several individual troughs has the purpose of narrowing the residence time spectrum even further.

The BV Fluid Bed Reactor (U.S. Pat. Ser. No. 4,058,374) represents a further development of this method. Here the individual troughs are arranged not next to one another but above one another, the fluidizing gas flowing through the individual fluid beds in turn. Inside the individual troughs back-mixing is to be prevented by baffles, which are immersed into the bed from above.

The disadvantage of this fluid bed technology is that the fluidizing gas on the one hand serves as reaction gas, but on the other hand has to carry the heat required for the endothermic carbonization reaction. Therefore only combustion gases can be used as a fluid medium, the temperature of which, corresponding to the heat requirement of the reaction, is higher than the activation temperatures in question. Also, the use of combustion gases as fluidizing gas means that water vapor partial pressures of at most 0.3 to 0.4 bars can be attained. To maintain the suspended state in the fluid bed a clearly defined minimum fluidization velocity is required, which is a function of the gas density (which changes with the temperature), the coal bulk density (which decreases during the course of the activation) and the coal particle diameter.

It may be gathered from the mutual dependence of the individual factors that an optimal setting is not simple with this fluid bed technology.

A further fluid bed reactor is known from German Offenlegungsschrift No. 2,615,437.

In this reactor, the harmful back-mixing effect is to be avoided by a greater height/diameter ratio and by feeding the coal through a tube immersed down to the grate and withdrawing it at the surface of the fluid bed.

Heating takes place indirectly through the jacket of the reaction space and by pre-heating the steam. The system permits working with very high water vapor partial pressures, at least over the gas inflow tray. When the fluid bed is high, however, there is pronounced formation of large bubbles (bypass flow), so that one has to operate with a large excess of steam. Furthermore, the additional heat transfer resistance of the reactor wall due to the indirect heating requires correspondingly high external temperatures.

SUMMARY OF THE INVENTION

The object of the invention is a method for carrying out gas/solid reactions, particularly activation and re-activation of activated carbon, characterized in that the reaction is carried out in a vibrating fluid bed which is arranged in a horizontal reaction space.

The activation and re-activation of activated carbon can be carried out with steam or other oxidizing gases, such as carbon dioxide, air, inter alia. The activating gases can be heated in a heat exchanger to temperature between 400° and 800° C. with the waste gases from the reaction.

According to the invention, the activation can be carried out in the following temperature ranges:

Steam temperature: 600° to 800° C.
Fluid bed temperature: 600° to 950° C.
Temperature of the gas body: 950° to 1200° C.

The heating of the reaction space can be carried out directly. Thus, heating gases of this type can flow either counter-currently or co-currently to the flow of the untreated coal.

These heating gases can be produced, for example, by the combustion of a propane/air mixture. Other heating gases or liquid fuels, e.g. heating oil or tar, can be used.

The flow of the waste gases from the activation reaction can be arranged in such a way that the untreated coal is pre-treated with these gases.

This pre-treatment of the untreated coal, in which the latter is subjected to drying, low temperature carbonization and/or pre-oxidation, can take place while the coal is being fed on to the vibrating fluid bed trough.

Feeding of the untreated coal can then take place in such a way it is conveyed by means of a metering device, for example, a metering screw, into a funnel. The waste gases from the reaction then flow around the funnel.

In an embodiment, it is possible to meter the untreated coal by means of a vibrating trough, which can possibly be arranged in the reaction waste gas channel.

In a further embodiment, a drying of the untreated coal can take place after feeding onto the vibrating fluid bed trough, the space underneath the gas inflow tray being divided and the reaction waste gases being fed at least partially into the first part and passed through the untreated coal.

During the activation, secondary air can additionally be introduced into the reaction space through one or more sparge pipes, which are arranged parallel to the vibrating fluid bed trough and which have a considerable number of holes.

When the reaction has progressed, it is possible to carry out the heating exclusively by the addition of secondary air.

The secondary air can be pre-heated to temperatures between 200° and 500° C. in a heat exchanger with the reaction waste gases.

A further subject of the invention is a device for carrying out the method according to the invention, which device is characterized by a vibrating fluid bed trough arranged in a double jacket.

The inner jacket, which is insulated on the oustide, surrounds the body of burning gas and serves mainly to reflect the heat radiation. Since it is loaded with respect to temperature (max. 1200° C.) up to the upper limit for metallic materials, care is taken that it is not subjected to any mechanical loading. The outer jacket encompassing the inner jacket takes up all the static loading and also serves to seal the interior of the furnace against the outer atmosphere.

The feeding device for the untreated coal can be arranged in the reaction waste gas channel.

Within the double jacket, a secondary air sparge pipe can be arranged parallel to the vibrating fluid bed trough which is driven by a vibrator.

The vibrating fluid bed trough can have two separate gas inlet openings and a dividing wall.

The method according to the invention and the device according to the invention have, in particular, the following advantages:

The approximate plug flow of the reaction material avoids the non-uniform back mixing, which results in a narrow residence time spectrum.

The cross flow of the fluidizing gases ensures high water vapor partial pressures in the coal bed and rapid removal of the inhibiting product gases such as hydrogen and carbon monoxide.

BRIEF DESCRIPTION OF THE DRAWINGS

The device according to the invention is further illustrated by the drawing wherein.

DETAILED DESCRIPTION OF THE DRAWINGS

Figure 1:
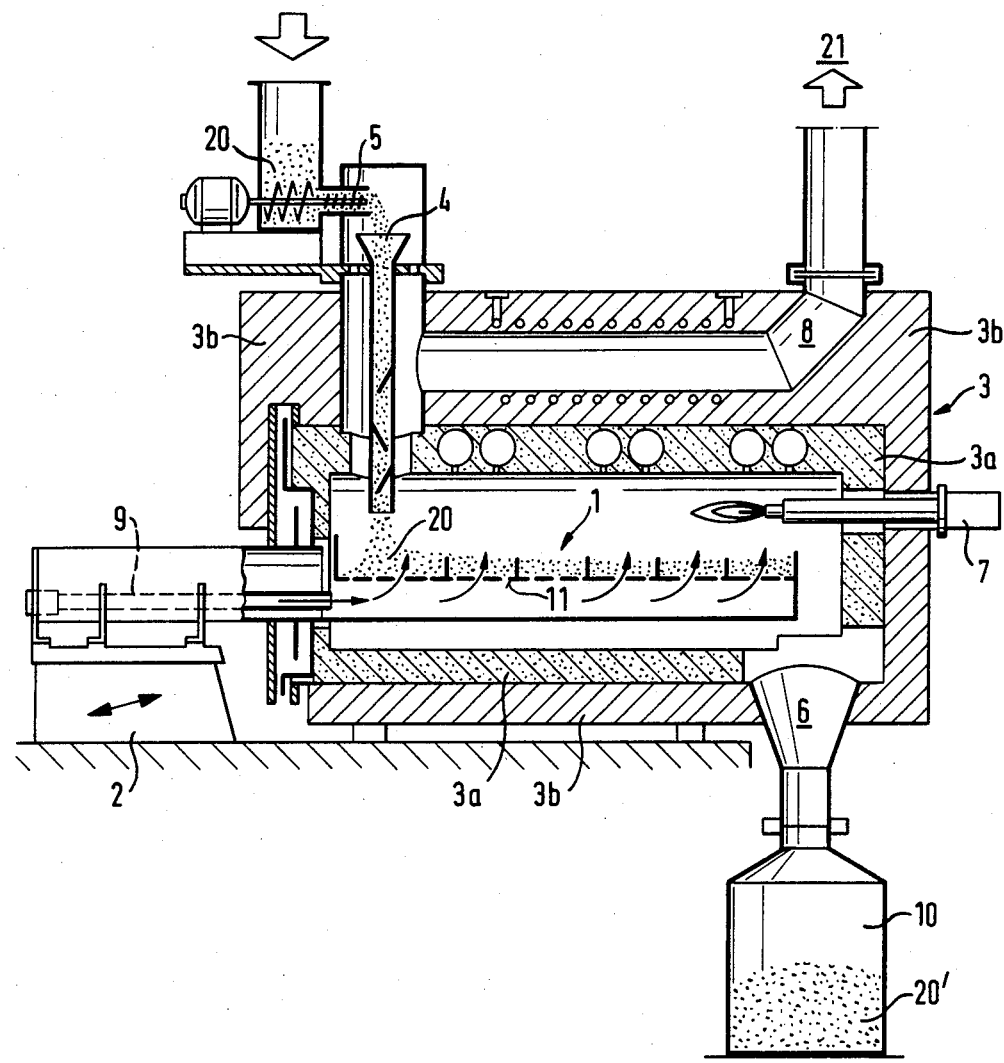
FIG. 1 shows the device according to the invention in longitudinal section.

According to FIG. 1, the device according to the invention includes the vibrating fluid bed trough 1, the vibration drive 2 for the vibrating fluid bed trough 1, the double jacket 3 which surrounds the vibrating fluid bed trough 1, the untreated coal feed 4 which is fed by the metering screw 5, the product discharge opening 6 in the double jacket 3, the burner 7, the waste gas opening 8 and the steam supply device 9.

The untreated coal 20 is fed into the funnel-shaped untreated coal feed 4 by means of the metering screw 5, the coal thus falling on to the vibrating fluid bed trough 1. The reaction waste gases 21 pass counter-current along the untreated coal feed 4 to the waste gas opening 8. The activated carbon 20' falls via the product discharge opening 6 into the storage container 10. The steam necessary for the reaction is introduced via the steam supply device 9 into the vibrating fluid bed trough 1 below the untreated coal 20 through the inflow tray 11 through the reacting material.

Figure 2:
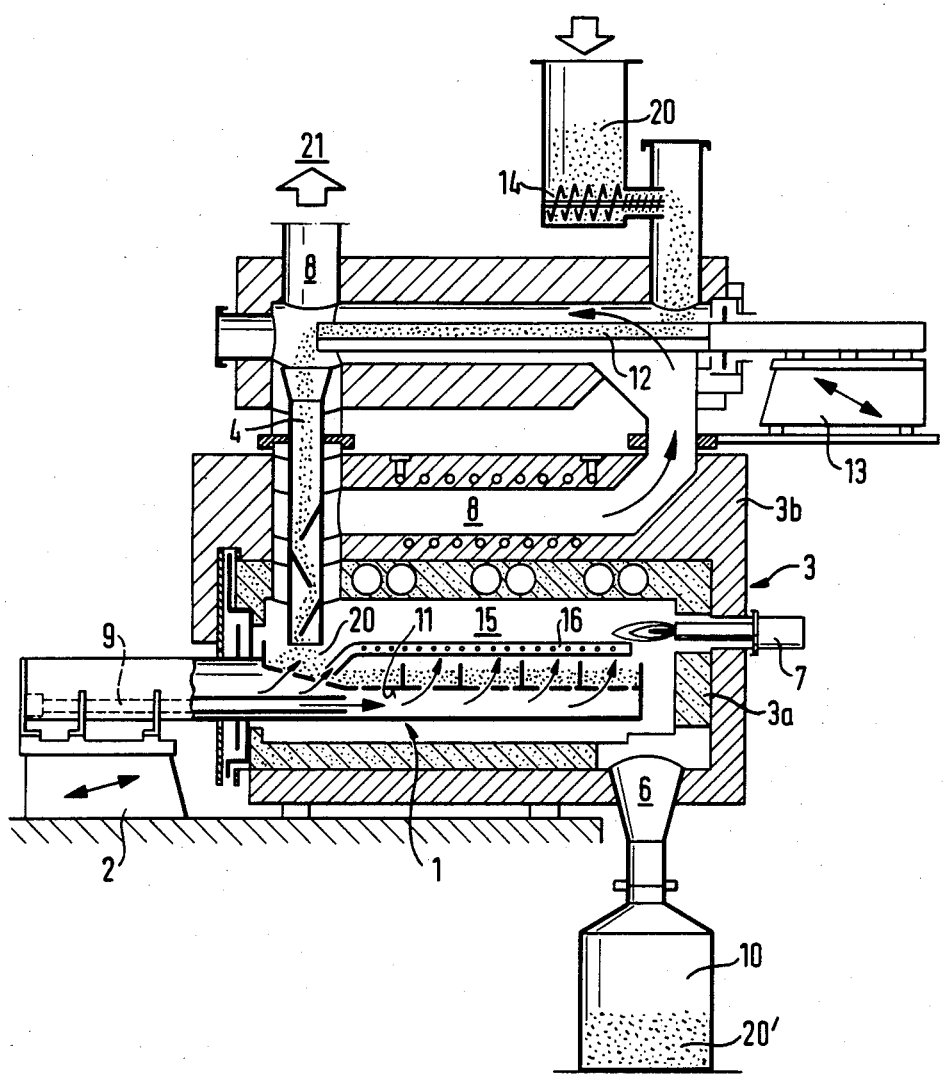
FIG. 2 shows an arrangement of the device according to the invention in longitudinal section with a coal pre-drier.

In accordance with FIG. 2, the untreated coal 20 is metered into the untreated coal feed 4 by means of a vibrating trough 12. This vibrating trough 12 is driven by means of the motor 13 and is arranged in such a way that the untreated coal is pre-heated by the reaction waste gases during the transport on the vibrating trough 12. The untreated coal is fed on to the vibrating trough 12 by means of the metering screw 14.

Additionally, the secondary air sparge pipe 16 is arranged in the reaction spaces 15 parallel to the vibrating fluid bed trough 1.

Figure 3:
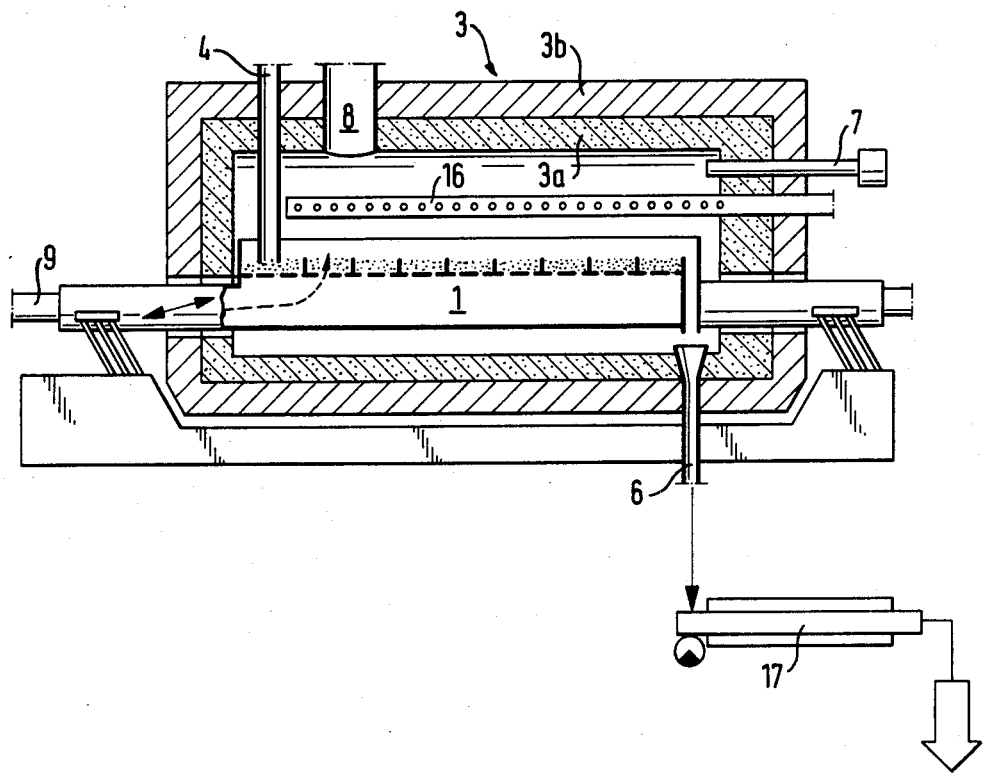
FIG. 3 shows an arrangement of the device according to the invention with built-in secondary air sparge pipe, in longitudinal section.

In accordance with FIG. 3, the secondary air sparge pipe 16 is arranged against the untreated coal flow in the vibrating fluid bed trough 1, so that the added air flows counter-currently to the reacting material. By means of the untreated coal feeding device 4, the untreated coal is fed directly into the vibrating fluid bed trough 1. The discharge of the activated carbon takes place in the vibrating spiral cooler 17, where the reaction material is cooled to below the reaction temperature.

Figure 4:
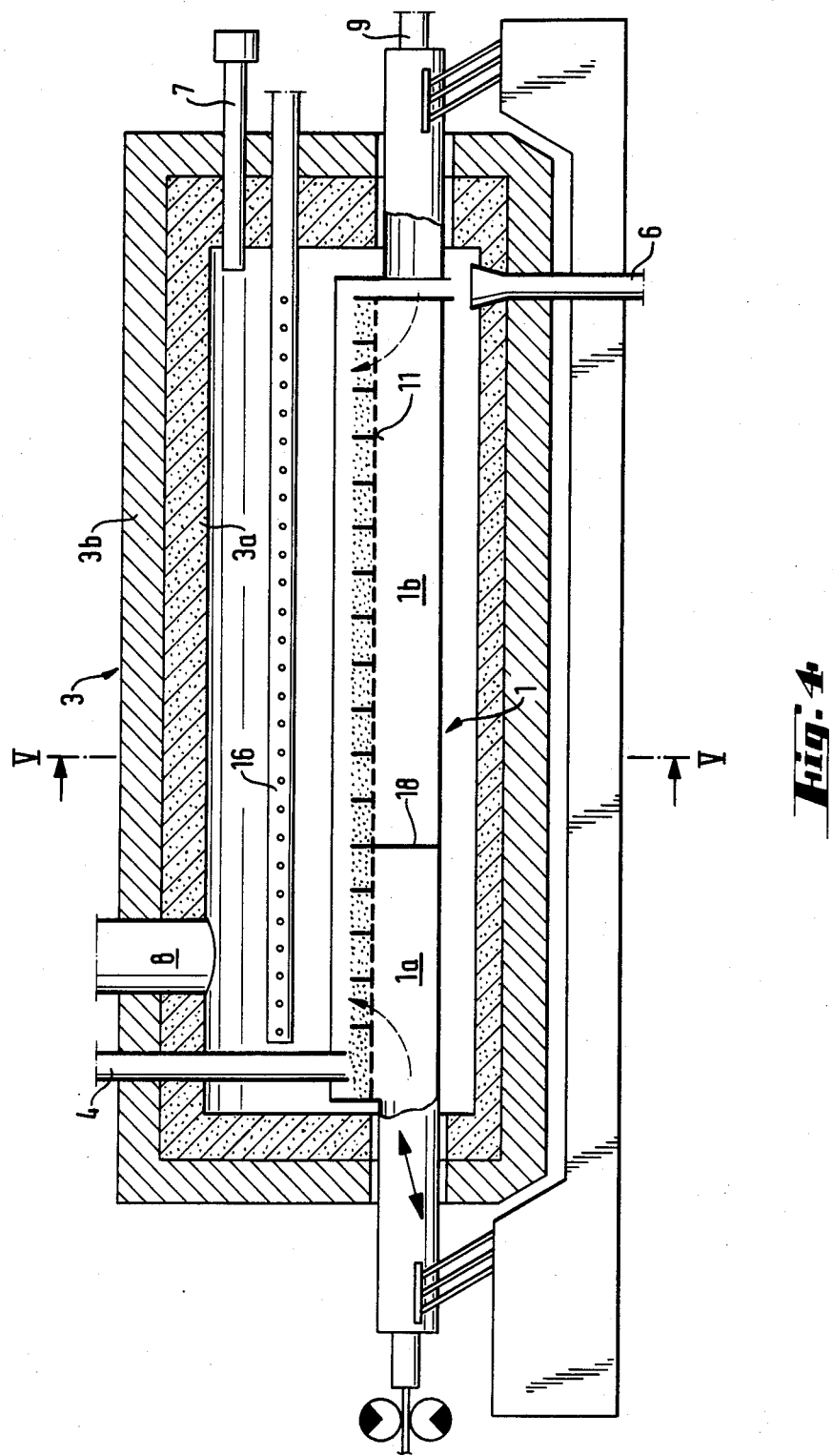
FIG. 4 shows an arrangement of the device according to the invention with built-in secondary air sparge pipe and coal drier in the vibrating bed, in longitudinal section.

According to FIG. 4, the vibrating fluid bed trough 1 is divided into two parts by the wall 18. In part 1a, the reaction waste gas passes through the inflow tray 11 into the untreated coal, thus drying it. In part 1b of the vibrating fluid bed, trough 1 steam is added.

Figure 5:
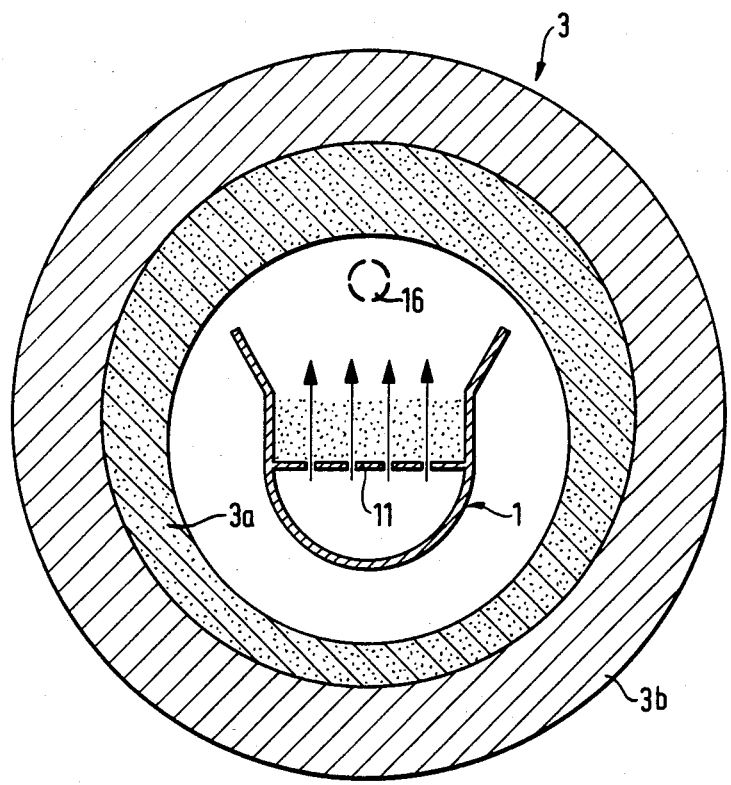
FIG. 5 shows the device according to the invention in cross-section.

In accordance with FIG. 5, the vibrating fluid bed trough 1, provided with the inflow tray 11, is arranged centrally in the double jacket 3. The secondary air sparge pipe 16 is arranged parallel to the vibrating fluid bed trough 1 and above it.

The method according to the invention is further explained and described by means of the following examples.

1. A device for carrying out gas/solid reactions for the activation of carbon and reactivation of activated carbon, comprising:

a double walled jacket having a hollow interior;

a fluid bed trough having a bottom wall and side walls positioned within the hollow interior of said double walled jacket;

an inflow tray having a plurality of openings therein for the passage of an activating gas therethrough, said inflow tray being secured to the interior surface of the side walls of said fluid bed trough so as to define a reaction space thereabove;

vibrating means in conection with said fluid bed trough for causing said fluid bed trough to vibrate;

feed means extending into the interior of said double walled jacket and providing means for supplying a solid material to the upper surface of said inflow tray;

activating gas supply means for introducing an activating gas into the area of said fluid bed trough above the bottom wall and below said inflow tray, whereby said activating gas passes through the openings in said inflow tray and comes in contact with the solid material lying on the upper surface of said inflow tray;

burner means for providing heat energy to the reaction space above said inflow tray, said burner means having an outlet nozzle extending into the hollow interior of said double walled jacket.

2. The device as recited in claim 1 wherein said double walled jacket has a waste gas conduit formed therein

|  |  |  | Example | | | | | |
| --- | --- | --- | --- | --- | --- | --- | --- | --- |
|  | Raw Material | | 1 | | 2 Lignite Coke | | 3 | |
|  | Method | | Activation | | | | Reactivation[1] | |
| Coal Feed | kg/h | | 16 | | 12 | | 11 | |
| Coal Discharge | kg/h | | 7.2 | | 5.2 | | 7.8 | |
| Combustion | % | | 55 | | 57 | | 31 | |
| Carbonization Performance | kgC/m²/h[6] | | 42 | | 39 | | 18 | |
| Heating Gas Flow Rate (Propane) | $m_n^3$/h | $m_n^3$/kgC | 0 | 0 | 0 | 0 | 0.6 | 0.2 |
| Primary Air Flow Rate | $m_n^3$/h | $m_n^3$/kgC | 10 | 1.1 | 7 | 1.0 | 15 | 4.7 |
| Secondary Air Flow Rate | $m_n^3$/h | $m_n^3$/kgC | 25 | 2.8 | 35 | 5.2 | 0 | 0 |
| Steam Flow Rate | kg/h | kg/kgC | 15 | 1.7 | 20 | 2.9 | 11 | 3.4 |
| Temperature °C. | | | | | | | | |
| Coal Bed | | | | | | | | |
| 1 | | | 840 | | 710 | | 780 | |
| 2 | | | 760 | | 740 | | 800 | |
| 3 | | | 720 | | 770 | | 750 | |
| Gas Body | | | | | | | | |
| 1 | | | 1,180 | | 1,010 | | 980 | |
| 2 | | | 1,120 | | 940 | | 970 | |
| 3 | | | 1,040 | | 980 | | 1,000 | |
|  |  | (2) | 1 | 2 | 1 | 2 | 1 | 2 |
| Benzene Charge[3] | p/po = 0.9 | g/100 g | 15.2 | 47.6 | 15.2 | 45.2 | 15.4 | 36.2 |
|  | p/po = 0.1 | g/100 h | not calc. | 17.7 | not calc. | 17.2 | not calc. | not calc. |
| Methylene Blue number[4] | | ml/0.1 g | 3.5 | 14.5 | 3.5 | 13.5 | 3.0 | 8.5 |
| Molasses Number[5] | | mg | ~1,500 | 200 | ~1,500 | 270 | ~1,600 | 480 |

[1]Reactivation of charged lignite coke which had been used for water purification.
[2]1 = Starting material, 2 = Product; not calc. = not calculated.
[3]Benzene charge is the amount of benzene which the carbon can absorb at 20° C. and a defined benzene partial pressure (p/po).
[4]Determination according to DAB 6.
[5]Molasses number: The amount of carbon in mg, which under standard conditions achieves the same amount of coloration as a defined standard activated carbon.
[6]The amount of carbon carbonized per hour, related to the fluid bed surface.

Further variations and modifications of the foregoing invention will be apparent to those skilled in the art and intended to be encompassed by the claims appended hereto.

We claim:

through which reaction waste gas travels.

3. The device as recited in claim 2, wherein a portion of said waste gas conduit surrounded said feed means such that the solid material passing through said feed means is pre-heated by the reaction waste gas traveling in said waste gas conduit.

4. The device as recited in claim 3 wherein said feed means includes a vibrating trough, said vitrating trough is surrounded by said waste gas conduit such that the reaction waste gas in said conduit acts to pre-heat the solid material being fed in on said vibrating trough.

5. A device as recited in claim 1 wherein one or more secondary air sparge pipes extend into the hollow interior of said double walled jacket, each of said sparge pipes being positioned so as to extend parallel to said fluid bed trough and each of said pipes being positioned within the reaction space above said inflow tray.

6. The device according to claim 1 wherein said fluid bed trough includes a dividing wall separating the area below said inflow tray into a first and a second chamber; said device further comprising reaction waste gas input means for the assertion of reaction waste gas into said first chamber whereby the reaction waste gas passes through the overlying openings in said inflow tray and acts to pre-heat the solid material lying on said inflow tray above said first chamber; and wherein said activating gas supply means extends into said second chamber.

7. A device as recited in claim 1 wherein said double wall jacket includes an inner jacket whose inner surface defines the hollow interior of said double walled jacket and is formed of a material which reflects heat energy, and an outer jacket encompassing the inner jacket wherein said outer jacket is capable of absorbing substantially all static loads which said device is subject to, such that the inner jacket is virtually free from static loading.

* * * * *